US009947916B2

(12) United States Patent
Oda et al.

(10) Patent No.: US 9,947,916 B2
(45) Date of Patent: Apr. 17, 2018

(54) CATHODE ACTIVE MATERIAL FOR NON-AQUEOUS ELECTROLYTE SECONDARY BATTERY MANUFACTURING METHOD THEREOF, AND NON-AQUEOUS ELECTROLYTE SECONDARY BATTERY

(75) Inventors: Syuhei Oda, Niihama (JP); Hiroyuki Toya, Niihama (JP); Katsuya Kase, Niihama (JP); Yutaka Oyama, Toyota (JP)

(73) Assignees: SUMITOMO METAL MINING CO., LTD., Tokyo (JP); TOYOTA JIDOSHA KABUSHIKI KAISHA, Aichi (JP)

( * ) Notice: Subject to any disclaimer, the term of this patent is extended or adjusted under 35 U.S.C. 154(b) by 157 days.

(21) Appl. No.: 13/577,670

(22) PCT Filed: Feb. 9, 2011

(86) PCT No.: PCT/JP2011/052691
§ 371 (c)(1),
(2), (4) Date: Oct. 19, 2012

(87) PCT Pub. No.: WO2011/099494
PCT Pub. Date: Aug. 18, 2011

(65) Prior Publication Data
US 2013/0037742 A1  Feb. 14, 2013

(30) Foreign Application Priority Data
Feb. 9, 2010 (JP) ................. 2010-026281

(51) Int. Cl.
| | |
|---|---|
| *H01B 1/08* | (2006.01) |
| *H01M 4/131* | (2010.01) |
| *H01M 4/139* | (2010.01) |
| *H01M 4/485* | (2010.01) |
| *H01M 4/505* | (2010.01) |
| *H01M 4/525* | (2010.01) |
| *C01G 53/00* | (2006.01) |

(52) U.S. Cl.
CPC .......... *H01M 4/131* (2013.01); *C01G 53/006* (2013.01); *C01G 53/42* (2013.01); *H01M 4/139* (2013.01); *H01M 4/485* (2013.01); *H01M 4/505* (2013.01); *H01M 4/525* (2013.01); *C01P 2004/53* (2013.01); *C01P 2004/61* (2013.01); *C01P 2006/40* (2013.01); *H01B 1/08* (2013.01)

(58) Field of Classification Search
CPC . Y02E 60/122; H01M 4/525; H01M 10/0525; H01M 4/131; H01M 4/505; H01B 1/08
USPC ........................................... 252/182.1, 519.1
See application file for complete search history.

(56) References Cited

U.S. PATENT DOCUMENTS

| | | | | |
|---|---|---|---|---|
| 5,227,235 | A   * | 7/1993 | Moro ................... | B22F 3/105 |
| | | | | 419/35 |
| 7,547,492 | B2 * | 6/2009 | Awano et al. ............. | 429/231.3 |
| 8,192,715 | B2 * | 6/2012 | Kawasato et al. ......... | 423/594.4 |
| 2002/0020527 | A1 * | 2/2002 | Kilaas et al. ............ | 166/250.01 |

FOREIGN PATENT DOCUMENTS

| | | |
|---|---|---|
| CN | 101489936 A | 7/2009 |
| JP | 9-270258 | 10/1997 |
| JP | 2001-243948 | 9/2001 |
| JP | 2006-089364 | 4/2006 |
| JP | 2006-127955 | 5/2006 |
| JP | 1 876 664 A1 | 1/2008 |
| JP | 2008-166269 | 7/2008 |
| JP | 2009-076383 | 4/2009 |
| JP | 2009-215143 | 9/2009 |

OTHER PUBLICATIONS

Notification of First Office Action issued by the State Intellectual Property Office of the People's Republic of China in Chinese Application No. 201180017942.5 dated Jun. 4, 2014 and English translation thereof.

* cited by examiner

*Primary Examiner* — William Young
(74) *Attorney, Agent, or Firm* — Finnegan, Henderson, Farabow, Garrett & Dunner LLP

(57) ABSTRACT

A non-aqueous electrolyte secondary battery is provided that has both good safety and durability characteristics while at the same time has high charge/discharge capacity. The cathode active material for a non-aqueous electrolyte secondary battery of the present invention is a lithium nickel composite oxide to which at least two or more kinds of metal elements including aluminum are added, and comprises secondary particles that are composed of fine secondary particles having an average particle size of 2 μm to 4 μm, and rough secondary particles having an average particle size of 6 μm to 15 μm, with an overall average particle size of 5 μm to 15 μm; where the aluminum content of fine secondary particles (metal mole ratio: SA) is greater than the aluminum content of rough secondary particles (metal mole ratio: LA), and preferably the aluminum concentration ratio (SA/LA) is within the range 1.2 to 2.6.

5 Claims, No Drawings

CATHODE ACTIVE MATERIAL FOR NON-AQUEOUS ELECTROLYTE SECONDARY BATTERY MANUFACTURING METHOD THEREOF, AND NON-AQUEOUS ELECTROLYTE SECONDARY BATTERY

CROSS-REFERENCE TO RELATED APPLICATIONS

This application is a national phase application of International Application No. PCT/JP2011/052691, filed Feb. 9, 2011, and claims the priority of Japanese Application No. 2010-026281, filed Feb. 9, 2010, the content of both of which is incorporated herein by reference.

TECHNICAL FIELD

The present invention relates to a non-aqueous electrolyte secondary battery and a cathode active material that is used as the cathode material thereof, and particularly to a cathode active material made using a lithium nickel composite oxide.

BACKGROUND ART

Lithium ion secondary batteries, which are non-aqueous electrolyte secondary batteries, are used as the power source for small mobile devices such as mobile telephones, video cameras, personal digital assistants (PDA) and the like. Furthermore, research and development of large-scale lithium ion secondary batteries for use in automobiles such as hybrid cars is underway. From such a background, higher capacity and battery output characteristics for lithium ion secondary batteries are needed, and particularly, for lithium ion secondary batteries for used in an automobile, batteries having life characteristics that can be used over a longer period of time than consumer use batteries are further required.

Lithium nickel composite oxide (LNO), which is one cathode material for a lithium ion secondary battery, has advantages over mainstream lithium cobalt oxide (LCO) in that it has a high capacity, the raw ingredient nickel (Ni) is less expensive than cobalt (Co), and is stably available, so it is expected to be used as the next generation of cathode material, and thus research and development thereof is actively continuing.

However, lithium nickel composite oxide has problems in that the crystal stability is low, and there are problems with cycling characteristics and thermal stability.

In order to solve these problems, improvement of the battery characteristics using various additional elements is being investigated. For example, in JP 9-270258 (A), improvement of durability by adding Co to $LiNiO_2$ is disclosed. However, even in a battery with the best durability, the capacity decreases by half after about 500 cycles, and in the case of use in an automobile, that durability is not sufficient.

On the other hand, as an improvement by concentration distribution of added elements, JP 2001-243948 (A) discloses a cathode active material for a lithium ion secondary battery with the object of improving the cycling characteristics by improving the structural stability that is characterized by using a LiCoO2 core and distributing a metal selected from among the group of Al, Mg, Sn, Ca, Ti and Mn at different concentration gradients from the surface to the center of the core. However, the object of this cathode active material for a lithium ion secondary battery is to improve the cycling characteristics of the battery, and does not take into consideration at all the improvement of safety of the battery. Moreover, it also dos not take into consideration application to a lithium nickel composite oxide, so the result in that case is unclear.

In order to improve the safety of lithium nickel composite oxide, JP 2008-166269 (A) proposes a lithium nickel composite oxide that is characterized by having Co and Al inside the particles, and having a concentration gradient of Mn concentration with respect to the radial direction of the particles, and with the Mn concentration being higher on the particle surface than in the center of the particle. However, in a battery that uses this lithium nickel composite oxide, resistance due to storage increases by 7% or more in one week, and when considering usage in an automobile, that durability is not sufficient.

There are particularly high expectations for the use of lithium ion secondary batteries as large-scale batteries for use as the power source for hybrid automobiles and electric automobiles, however, in this case, ensuring durability over a long period of time is essential. However, currently there is no lithium ion secondary battery that has both high safety and durability while at the same time having a high discharge capacity.

RELATED LITERATURE

Patent Literature

[Patent Literature 1] JP 9-270268 (A)
[Patent Literature 2] JP 2001-243948 (A)
[Patent Literature 3] JP 2008-186269 (A)

SUMMARY OF THE INVENTION

Problem to be Solved by the Invention

The object of the present invention is to provide a non-aqueous electrolyte secondary battery, which has both high safety and durability while at the same time has high discharge capacity, and a cathode active material that makes it possible to achieve this non-aqueous electrolyte battery.

Means for Solving the Problems

In consideration of the problems described above, the inventors diligently studied lithium ion secondary batteries and cathode materials that are capable of achieving both excellent safety and durability, and as a result of this research gained the knowledge that led to the completion of the present invention that is able to achieve both excellent safety and durability for a battery that uses as a cathode material a lithium nickel composite oxide that contains aluminum that is composed of fine secondary particles and rough secondary particles, where the aluminum content in fine secondary particles is greater than the aluminum content in the rough secondary particles.

In other words, the cathode active material for a non-aqueous electrolyte secondary battery of the present invention is a lithium nickel composite oxide to which at least two or more kinds of metal elements including aluminum are added, and comprises secondary particles that are composed of fine secondary particles having an average particle size of 2 μm to 4 μm, and rough secondary particles having an average particle else of 6 μm to 15 μm, with an overall average particle size of 5 μm to 15 μm; where the aluminum content of fine secondary particles (metal mole ratio: SA) is greater than the aluminum content of rough secondary particles (metal mole ratio: LA).

Preferably, the lithium nickel composite oxide is expressed by the general formula: $Li_wNi_{1-x-y-z}Co_xAl_yM_zO_2$ (however, M is at least one kind of element selected from among Mn, Ti, Ca, Mg, Nb Si, Zr and W, and $0.99 \leq w \leq 1.10$, $0.05 \leq 0.30$, $0.01 \leq y \leq 0.1$, $0 \leq z \leq 0.01$), and preferably, the ratio of the aluminum content of fine secondary particles (SA) and the aluminum content of rough secondary particles (LA) (aluminum concentration ratio: SA/EA) is within the range 1.12 to 2.6, and particularly is 1.2 or greater.

Moreover, preferably the particle size distribution according to laser diffraction scattering measurement is in the range of 0.5 μm to 6 μm for fine secondary particles, and in the range of 3 μm to 25 μm for rough secondary particles, and preferably the ratio of mixed fine secondary particles is 1% to 10% by volume with respect to the overall lithium nickel composite oxide.

A manufacturing method for the cathode active material for a non-aqueous electrolyte secondary battery of the present invention comprises steps of: adding and mixing an aluminum compound with a nickel composite hydroxide; performing oxidizing roasting of the obtained nickel composite hydroxide that contains aluminum; further adding and mixing a lithium compound with the obtained nickel composite oxide that contains aluminum; baking the obtained mixture to obtain a cathode active material for a non-aqueous electrolyte secondary battery composed of a lithium nickel composite oxide; wherein in the step of adding and mixing an aluminum compound with the nickel composite hydroxide, the aluminum compound is added and mixed with the nickel composite hydroxide composed of fine secondary particles having an average particle size of 2 μm to 4 μm and the nickel composite hydroxide composed of rough secondary particles having an average particle size of 6 μm to 15 μm so that the aluminum content of the fine secondary particles (metal mole ratio: SA) is greater than the aluminum content of the rough secondary particles (metal mole ratio: LA); to obtain a nickel composite oxide that contains aluminum composed of secondary particles having an overall average particle size of 5 μm to 15 μm.

Furthermore, the non-aqueous electrolyte secondary battery of the present invention uses the cathode active material for a non-aqueous electrolyte secondary battery described above as the cathode material.

Effect of the Invention

The cathode active material for a non-aqueous electrolyte secondary battery of the present invention is a lithium nickel composite oxide, and when used as the cathode material of a lithium ion secondary battery, it is possible to achieve both excellent safety and durability for that battery. Even when the lithium ion battery that uses the cathode active material of the present invention as a cathode material is applied as the power source for an automobile such as a hybrid automobile or electric automobile it is possible to use the battery over a long period of time while maintaining excellent safety.

In this way, the cathode active material or a non-aqueous secondary battery of the present invention and the non-aqueous secondary battery that uses this cathode active material can be suitably used in a large secondary battery for use in an automobile that requires a high capacity, as well as excellent safety and durability, so it can be said to have very large industrial value.

MODES FOR CARRYING OUT THE INVENTION (1) Cathode Active Material

The cathode active material for a non-aqueous electrolyte secondary battery of the present invention is a lithium nickel composite oxide to which at least two or more metal elements, including aluminum, are added, and is characterized by a secondary particles having an average particle size of 5 μm to 15 μm, in which fine secondary particles having an average particle size of 2 μm to 4 μm and rough secondary particles having an average particle size of 6 μm to 15 μm are mixed, and where the aluminum content (SA) of those fine secondary particles is greater than the aluminum content (LA) of those rough secondary particles. Here, the aluminum content is a value that indicates the metal molar ratio of the amount of aluminum with respect to the total amount of metal other than lithium included in the secondary particles.

In the lithium nickel composite oxide (LNO) used as a cathode active material for non-aqueous electrolyte secondary batteries, in order to improve safety and durability, improvement by using various added elements is being investigated. When added elements are uniformly diffused inside an LNO crystal, the LNO crystal structure becomes stable. However, when added elements are increased in order to improve stability, the amount of nickel that contributes to the oxidation-reduction reaction that accompanies the charge and discharge reaction decreases, so the battery capacity, which is the most important battery characteristic, greatly decreases. Therefore, it is necessary to limit the amount of added elements to as small an amount as possible.

Normally, a powdered lithium nickel composite oxide has a certain wide range of particle size distribution. In other words, the powdered lithium nickel composite oxide is a mixture of fine secondary particles and rough secondary particles. The fine secondary particles have larger surface area per volume than the rough secondary particles, and the insertion/extraction reaction of Li ions inside the battery due to discharge occurs on the surface of the lithium metal oxide particles, so it is considered that fine secondary particles is easily used than rough secondary particles for the reaction. Therefore, when compared with rough secondary particles, the load on fine secondary particles is larger, so the fine secondary particles will degrade first, causing the safety and durability of the battery to decrease.

Therefore, it can be said that by improving the durability of fine secondary particles that are included in the lithium nickel composite oxide, the safety and durability of the battery will also be improved.

In the case of adding a sufficient amount of added elements in order to improve safety and durability, when the composition of the overall lithium nickel composite oxide is made uniform, the battery capacity greatly decreases. However, by increasing the amount of added element to the fine secondary particles, of which improvement of safety and durability are particularly needed, the amount of added elements to the overall lithium nickel composite oxides is controlled, and together with being able to maintain sufficient battery capacity, it becomes possible to stabilize the crystal structure of the fine secondary particles, and to achieve both safety and durability for the overall lithium nickel composite oxide. The cathode active material of the present invention is made based on this kind of technical knowledge.

In other words, in the cathode active material of the present invention, making the aluminum content (SA) in fine secondary particles having an average particle size of 2 μm to 4 µm greater than the aluminum content (LA) in rough secondary particles having an average particle size of 6 µm to 15 µm has important significance.

Aluminum is effective in order to improve the safety and durability of lithium nickel composite oxide. Therefore, the cathode active material of the present invention is a lithium nickel composite oxide to which at least two or more metal elements, including aluminum, are added, and by further increasing the aluminum content in the fine secondary particles, it is possible to improve the safety and durability of the overall lithium nickel composite oxide.

The cathode active material of the present invention has an overall secondary particle size of 5 µm to 15 µm, and is a mixture of fine secondary particles having an size of 2 µm to 4 µm and rough secondary particles having an average particle size of 6 µm to 15 µm and preferably 6 µm to 10 µm. When the average particle size of fine secondary particles is less than 2 µm, the improvement of the safety and durability in not sufficient even when aluminum is added to the fine secondary particles, and therefore the addition of aluminum is not reflected on the improvement of the safety and durability of the overall cathode active material. Moreover, when the average particle size of fine secondary particles exceeds 4 µm, the ratio of line secondary particles in the overall lithium metal oxide increases, and particles containing much aluminum increase, so as a cathode active material, it is not possible to obtain sufficient battery capacity.

On the other hand, when the average particle size of rough secondary particles is less than 6 µm, the particles having only a small amount of aluminum added despite of having the small particle size increase, so it is not possible to obtain sufficient safety and durability. Furthermore, when the average particle size of rough secondary particles exceeds 15 µm, in order to make the overall average particle size 5 µm to 15 µm, the amount of fine secondary particles must be increased, so as a cathode active material it is not possible to obtain sufficient battery capacity.

Preferably, the ratio of the aluminum content (SA) of the fine secondary particles and the aluminum content (LA) of the rough secondary particles (aluminum concentration ratio; SA/LA) is 1.12 to 2.6. When the aluminum concentration ratio SA/LA is less than 1.12, the difference between the aluminum added to the fine secondary particles and to the rough secondary particles becomes small, and when a large current such as in the case of an overcharge, or a short circuit, Li is extracted first from the fine secondary particles and the crystal structure becomes unstable. Then, when decomposition occurs in the structurally unstable fine secondary particles as oxygen is released, thermal runaway occurs, and there is a high possibility that this will cause a decrease in thermal stability. Therefore, when the aluminum concentration ratio SA/LA is less than 1.12, there is a possibility, that as a cathode active material, sufficient safety and battery capacity will not be obtained. In order to obtain more sufficient safety and battery capacity, it is particularly preferred that the ratio SA/LA be 1.2 or greater. On the other hand, when the ratio SA/LA is greater than 2.6, the amount of aluminum that is added to the rough secondary particles is too little, so the safety and durability of the rough secondary particles decreases, and as a cathode active material, it is possible that sufficient safety and durability will not be obtained.

In the cathode active material of the present invention, the particle size distribution according to laser diffraction scattering measurement is preferably in the range of 0.5 µm to 6 µm for fine secondary particles, and in the range of 3 µm to 25 µm for rough secondary particles. Even when the average particles size is in the range of 2 µm to 4 µm, when the particle size distribution of fine secondary particles spreads to less than 0.5 µm, it is not possible to sufficiently improve safety and durability even though aluminum is added to the particles having a particle size of less than 0.5 µm, and as a cathode active material, it may not be possible to sufficiently improve the safety and durability. On the other hand, when the particle size distribution of fine secondary particles spreads to exceeds 6 µm, the ratio of fine secondary particles having a large amount of added aluminum increases, and as a cathode active material, it may not be possible to obtain sufficient battery capacity.

Moreover, even when the average particle size of the rough secondary particles is in the range 6 µm to 15 µm, when the particle size distribution spreads to less than 3 µm, there will be fine secondary particles having a small amount of added aluminum, and so there is a possibility that the fine particles will degrade first, and that the durability of the battery will decrease. However, when the particle size distribution spreads to exceed 25 µm, the specific surface area of the cathode active material may decrease, and it may not be possible to obtain sufficient battery capacity.

Furthermore, in the cathode active material of the present invention, preferably the ratio at which the fine secondary particles are mixed is a volume ratio of 1% to 10% of the overall lithium metal oxide. When this mixture ratio is such that the volume ratio is less than 1%, the average particle size of the overall cathode active material may exceed 15 µm. Moreover, when the mixture ratio is such that the volume ratio exceeds 10%, the particles having a large amount of added aluminum increase, so as a cathode active material it may not be possible to obtain sufficient battery capacity.

The cathode active material of the present invention is a lithium nickel composite oxide to which at least two or more metal elements, including aluminum, are added in order to improve the safety and durability and particularly, in order to improve the durability and obtain high capacity, the cathode active material is a lithium nickel composite oxide whose composition is represented by the general formula: $Li_wNi_{1-x-y-z}Co_xAl_yM_zO_2$ (M is at least one kind of element selected from the group of Mn, Ti, Ca, Mg, Nb, Si, Zr and W, and $0.99 \leq w \leq 1.10$, $0.05 \leq x \leq 0.30$, $0.01 \leq y \leq 0.1$, $0 \leq z \leq 0.01$). Each added element will be explained in detail below.

a) Co

Cobalt (Co) is an added element that contributes to the improvement of the cycling characteristic. Here, when the value "x" that indicates the additive amount thereof is less than 0.05, it is not possible to obtain a sufficient cycling characteristic, and there is a possibility that the capacity retention will also decrease. On the other hand, when the value "x" exceeds 0.3, there is a possibility that the decrease in the initial discharge capacity will become large. Moreover, the amount of expensive Co used increases, which is not desirable from the aspect of cost.

b) Al

Aluminum (Al) is an added element that has the effect of improving safety and durability. When the value "y" that indicates the additive amount thereof is less than 0.01, as the additive amount thereof is too little, there is a possibility that the effect of adding aluminum will not be sufficiently obtained. On the other hand, when the value "y" is greater than 0.1, the safety and durability is further improved by increasing the additive amount thereof, however, Al itself does not contribute to the charge/discharge reaction, so the charge/discharge capacity of the battery decreases, and the energy density decreases, so is not preferred. In considering a balance among the charge/discharge capacity, safety and durability, a value of about 0.04 is preferred.

In regards to both the fine secondary particles and the rough secondary particles, it is preferred that the SA/LA ratio be within the range 1.2 to 2.6, and that for the fine secondary particles the value "y" be 0.03 to 0.1, and that for the rough secondary particles the value "y" be 0.01 to 0.05.

c) M

The added element M is not particularly limited, and as long as it is an element that improves the cycling characteristic and the safety, and has an effect on reducing the reaction resistance, it is preferred that at least one kind of element be selected from the group of Mn, Ti, Ca, Mg, Nb, Si, Zr and W. Particularly, when Ca or Mg, or both are added, the effect on the improvement of safety is large. When the added element M is uniformly diffused in the lithium nickel composite oxide crystals, the crystal structure of the lithium nickel composite oxide is stabilized. As a result, it is possible to also the thermal stability of the non-aqueous electrolyte secondary battery.

The addition of M is arbitrary, however, when added, it is preferred that the value of "z" that indicates the additive amount thereof be 0.0003 or greater. When the value "z" is less than 0.0003, there is not enough effect for stabilizing the crystal structure, and on the other hand, when the value "z" is greater than 0.01, the crystal structure is further stabilized, however, the amount of decrease in the initial discharge capacity becomes large, so is not preferred.

In the present invention, the lithium nickel composite oxide is in the form of spherical secondary particles in which primary particles are clumped together, and preferably the average particle size of the overall secondary particles is 5 µm to 15 µm. When the average particle size is less than 5 µm, the tap density decreases, and there is a possibility that the battery capacity per unit mass will decrease. On the other hand, when the average particle size is greater than 15 µm, the specific surface area becomes small and thus the reaction area becomes insufficient, which lowers the output characteristics, so is not preferred. In the present invention, in order to measure the average particle size, the volume median (50%) diameter of the integrated value obtained by a laser scattering particle size distribution measuring device is used.

(2) Manufacturing Method for a Cathode Active Material

The manufacturing method for manufacturing the cathode active material for the non-aqueous electrolyte secondary battery of the present invention will be explained for the case where the lithium nickel composite oxide is represented by the general formula: $Li_wNi_{1-x-y-z}Co_xAl_yM_zO_2$ (M is at least one kind of element selected from the group of Mn, Ti, Ca, Mg, Nb, Si, Zr and W, and $0.99 \leq w \leq 1.10$, $0.05 \leq x \leq 0.30$, $0.01 \leq y \leq 0.1$, $0 \leq z \leq 0.01$). The present invention is not particularly limited to the manufacturing method described in this disclosure, and can be modified or improved by one skilled in the art based on the disclosed knowledge.

2-1) Manufacturing Nickel Composite Hydroxide

First, a nickel composite hydroxide is manufactured. Nickel composite hydroxide can be manufactured according to various known technology.

For example, an alkali aqueous solution is added to an aqueous solution, which includes nickel salt, cobalt salt and M-metal salt that are mixed at specified ratios, in order to adjust the pH, and then by coprecipitation of the Ni, Co and M hydroxides a nickel composite hydroxide that is expressed by the general formula $Ni_{1-x-y-z}Co_xM_z(OH)_2$ (where "y" is the amount of Al contained) is obtained. The ratios of Ni, Co and M in the aqueous solution are set according to the composition of the lithium nickel composite oxide that will finally be obtained. The coprecipitation conditions are preferably a solution temperature of 50° C. to 80° C., and a pH of 10.0 to 13.5 that is measured at a solution temperature of 25° C., and a complexing agent such as an ammonium ion donor can also be added to the aqueous solution.

The nickel composite hydroxide that is obtained from coprecipitation has the form of secondary particles in which primary particles are clumped together, and in this case, the shape of the secondary particles is preferably spherical, and the overall average particle size of the secondary particles is preferably adjusted to be 5 µm to 15 µm. The shape and average particles size of the particles can be can be adjusted by controlling the mixing rate of mixing the aqueous solution and alkali solution above and the coprecipitation conditions.

Filtering, washing and drying are performed for the obtained nickel cobalt composite hydroxide, and these processes can be performed by a normal method.

In addition, it is also possible to use a method for mixing raw hydroxides or oxides of the added elements.

Moreover, in this case, before adding Al in a later process, the fine secondary particles and the rough secondary particles are classified, however, in the process of manufacturing this nickel composite hydroxide, it is also possible to separately manufacture a nickel composite hydroxide having an average particle size of 2 to 4 µm and a nickel composite hydroxide having an average particle size of 6 to 15 µm, and to use these as the fine secondary particles and the rough secondary particles.

2-2) Adding Al

An aluminum compound is caused to adsorb into the particle surface of the obtained nickel composite hydroxide to obtain a nickel composite hydroxide that contains aluminum that can be expressed with the general formula: $Ni_{1-x-y-z}Co_xAl_yM_z(OH)_2$ (where "y" is the amount of Al contained).

First, when fine secondary particles and rough secondary particles are not separately manufactured in the process above, the obtained nickel composite hydroxide is classified and divided into fine secondary particles having an average particle size of 2 to 4 µm and rough secondary particles having an average particle size of 6 to 15 µm.

Next, after considering the mixture ratios of the fine secondary particles and the rough secondary particles so as to ensure the aluminum concentration ratio (SA/LA) of the fine secondary particles and rough secondary particles of 1.2 to 2.6 and the entire aluminum content ("y" value) of 0.01 to 0.1, an aluminum compound is caused to adsorb into each of the nickel composite hydroxides.

Adsorption is performed by making a slurry of the nickel composite hydroxide particles, and adding an aqueous solution containing an aluminum compound while mixing the slurry and adjusting the pH. It is also possible after the aqueous solution containing a desired concentration of aluminum salt has been mixed into the slurry, to adjust the pH and cause the aluminum compound to adsorb into the surface of the particles of the nickel composite hydroxide.

As the aluminum compound, it is possible to use an aluminum salt such as an aluminate alkali salt. Preferably, the aluminate alkali salt is a sodium aluminate or a potassium aluminate. By using an aluminate alkali salt, an aluminum hydroxide that is created by neutralization is adsorbed on the surface of a nickel composite hydroxide that is suspended in water, however, an aluminum hydroxide that is created and precipitated out by neutralization has comparatively good filterability, and it is possible to uniformly disperse the aluminum hydroxide around the nickel composite hydroxide without separating from the nickel composite hydroxide during washing after filtration (refer to JP 11-16572 (A)).

After addition of aluminum, both secondary particles are mixed and adjusted to the ratio of the aluminum in the lithium nickel composite oxide to be finally obtained. Normally, nearly the entire concentration is precipitated out as a compound (aluminum hydroxide) from the aluminum salt, so the amount of aluminum salt to be added can be found from the ratio of aluminum in the lithium nickel composite oxide.

After the aluminum hydroxide has been adsorbed into the surface of the particles of the nickel composite hydroxide, filtering, washing and drying are performed. Filtering, washing and drying can be performed by the same method as used when manufacturing the nickel composite hydroxide.

2-3) Oxidizing Roasting

Next, oxidizing roasting is performed for the nickel composite hydroxide with aluminum hydroxide adsorbed on the surface thereof. By performing oxidizing roasting, it is possible to improve the reactivity with Li, to enable the reaction to sufficiently proceed in short time, and thus improve productivity.

The oxidizing roasting temperature is preferably 650° C. to 750° C., and more preferably 700° C. to 750° C. When the temperature is less than 650° C., the oxide film that is formed on the surface is not sufficient, and when the temperature exceeds 750° C., the surface area is reduced too much and the reactivity with Li decreases, which is not desirable.

As long as the oxidizing roasting atmosphere is a nonreduced atmosphere there is no problem, and an air atmosphere or oxygen atmosphere are preferred. The oxidizing roasting time and processing furnace are not particularly limited, and can be adequately set according to the amount to be processed and the oxidizing roasting temperature. For example, the oxidizing roasting time is preferably one hour or more, and even more preferably 3 to 15 hours. When the time is less than one hour, the conversion from a hydroxide to an oxide may not be performed sufficiently. Moreover, when the time is less than 3 hours, there is a possibility that the crystal characteristic of the nickel composite oxide will not be improved and that thermal stability will not be sufficiently obtained. Furthermore, the furnace that is used for oxidizing roasting is not particularly limited, and any furnace can be used as long as heating can be performed in a current of air, however, preferably an electric furnace with no gas generation is used, and a batch-type or continuous-type furnace can be used.

2-4) Addition of Li

In order to add Lithium (Li), the nickel composite oxide that was obtained from oxidizing roasting is mixed with a lithium compound to obtain a mixture. The amount of lithium compound to be mixed in is appropriately set from the composition of the lithium nickel oxide to be finally obtained that is expressed by the general formula: $Li_wNi_{1-x-y-z}Co_xAl_yM_zO_2$ (M is at least one kind of element selected from the group of Mn, Ti, Ca, Mg, Nb, Si, Zr and W, and $0.99 \leq w \leq 1.10$, $0.05 \leq x \leq 0.30$, $0.01 \leq y \leq 0.1$, $0 \leq z \leq 0.01$).

As the lithium compound to be mixed in, it is possible to use a lithium salt such as a lithium nitrate or a lithium hydroxide, however, using a lithium hydroxide is particularly preferred.

To perform the mixing above, it is possible to use a dry type mixer or granulator such as a V blender, Spartan mixer, Lodige mixer, Julia mixer or vertical granulator, and mixing is preferably performed over a suitable time range so that the mixture is uniformly mixed.

2-5) Baking

The mixture above is baked to obtain a lithium nickel composite oxide, which is the cathode active material for a non-aqueous electrolyte battery. Here, the baking temperature is preferably 650° C. to 800° C., and more preferably 700° C. to 800° C. The hold time at the maximum temperature can be any time as the reaction proceeds, and preferably is about 1 to 10 hours. The atmosphere during baking is preferably an oxidizing atmosphere such as an oxygen atmosphere.

When the baking temperature is less than 650° C., the reaction with the lithium compound does not proceed sufficiently, and it is difficult to combine a lithium nickel composite oxide that has a layered structure and good crystal characteristics. On the other hand, when the temperature exceeds 800° C., cationic mixing begins to occur, and other metal ions begin to mix into to the Li sites, causing the battery characteristics to decrease, so it is not desirable.

(3) Non-aqueous Electrolyte Secondary Battery

The non-aqueous electrolyte secondary battery of the present invention comprises a cathode, an anode, a non-aqueous electrolyte and the like, and is constructed by the same components as a typical non-aqueous electrolyte secondary battery. The embodiment explained below is only an example, and the non-aqueous electrolyte secondary battery of the present invention is not particularly limited by the embodiment described in this disclosure, and can be appropriately modified or improved by one skilled in the art based on the knowledge disclosed below. Moreover, the non-aqueous electrolyte secondary battery of the present invention is not particularly limited to the usage described below.

(a) Cathode

The cathode active material for a non-aqueous electrolyte secondary battery obtained as described above is used as the cathode material, and for example a cathode for a non-aqueous electrolyte secondary battery is made as described below.

First, powdered cathode active material, conductive material, and binding agent are mixed, then an aqueous medium is added and the mixture is kneaded to create a cathode mixture aqueous paste. The mixture ratios of the elements in the cathode mixture aqueous paste are important for setting the characteristics of the non-aqueous electrolyte secondary battery. When the overall mass of the solid content of the cathode mixture except for the aqueous medium is taken to be 100 parts by mass, preferably as in the case of a cathode for a typical non-aqueous electrolyte secondary battery, the mass ratio of the cathode active material is taken to be 80 to 95 parts by mass, and the mass ratio of conductive material is taken to be 2 to 15 parts by mass, and the binding agent is taken to be 1 to 20 parts by mass.

The obtained cathode mixture paste is, for example, applied to the surface of a current collector made of aluminum foil, then dried and the solvent is allowed to disperse. As necessary, pressure may be applied by a roll press in order to increase the electrode density. A sheet-shaped cathode can be made in this way. The sheet-shaped cathode can be cut to a suitable size depending on the intended use of the battery, and then provided for making a battery.

When making the cathode the conducting agent that is used can be, for example, graphite (natural graphite, man-made graphite, expanded graphite or the like), or a carbon black material such as acetylene black or Ketgenblack.

The binding agent is an agent that serves the role of binding together active particles, and a water-soluble polymer that dissolves in water is preferred. As this kind of polymer material there is carboxymethyl cellulose (CMC), methyl cellulose (MC), cellulose acetate phthalate (CAP), hydroxypropyl methyl cellulose (HPMC), hydroxypropylmethylcellulose phthalate (HPMCP), polyvinyl alcohol (PVA), polyethylene oxide (PEO) and the like, which are hydrophilic polymers. Moreover, it is also possible to suitably use polymer material that disperses in water (water dispersible polymer). For example, a fluorine-based resin such as polytetrafluoroethylene (PTFE), tetrafluoroethyleneperfluoro alkyl vinyl ether copolymer(FEP), ethylene-tetrafluoroethylene copolymer (ETFE) and the like, or a rubber such as vinyl acetate copolymer, styrene butadiene block copolymer (SBR), acrylic acid modified SBR (SBR latex), gum arable and the like. Of these, using a fluorine-based resin such as PTFE is preferred.

The water-based paste can be adjusted by adding the cathode active material of the present invention, and additives such as the conducting agent and binding agent described above, to a suitable aqueous medium, then dispersing or dissolving and mixing the materials.

The adjusted paste is applied to the cathode current collector, then after the aqueous medium is also to volatilize and dry, the paste is compressed. Typically a suitable application device (coater) can be used to apply the paste for forming an active material layer on the surface of the current collector at a specified thickness. The thickness of the applied paste is not particularly limited, and can differ according to the shape and usage of the cathode and battery. For example, the paste can be applied to the surface of an aluminum foil current collector having a thickness of about 10 μm to 30 μm at a dried thickness of about 5 μm to 100 μm. By using a suitable drier to dry the coated material after being applied, the cathode active material can be formed on the surface of the current collector at a specified thickness. The cathode obtained in this way can be pressed as desired to obtain a cathode sheet having the intended thickness.

(b) Anode

An anode, which is formed by mixing a binding agent with metallic lithium or lithium alloy, or an anode active material of which lithium ions can be occluded or desorbed, then adding a suitable medium to form a paste like anode mixture, after which the paste is applied to the surface of a metal foil current collector made of copper or the like, then dried, and as necessary compressed in order to increase the electrode density, is used.

As the anode active material, a suitable carbon material such as natural graphite, manmade graphite, graphitizable carbon material, or a combination of these can be used.

(c) Separator

A separator is placed between the cathode and the anode. The separator separates the cathode and anode and holds the electrolyte; a thin film made of polyethylene, polypropylene or the like, and that has many minute holes can be used.

(d) Non-aqueous Electrolyte

The non-aqueous electrolyte is an electrolyte made by dissolving a lithium salt as a supporting electrolyte in an organic solvent.

As the organic solvent one type alone or a mixture of two types or more selected from the group of a cyclic carbonate such as ethylene carbonate, propylene carbonate, butylene carbonate, trifluoro propylene carbonate and the like; a chain-shaped carbonate such as diethyl carbonate, dimethyl carbonate, ethyl methyl carbonate, dipropyl carbonate and the like; an ether compound such as tetrahydrofuran, 2-methyltetrahydrofuran, dimethoxyethane and the like; a sulphur compound such as ethyl methyl sulfone, butane sultone and the like; and a phosphorus compound such as triethyl phosphate, trioctyl phosphate and the like.

As the supporting electrolyte, it is possible to use $LiPF_6$, $LiBF_4$, $LiClO_4$, $LiAsF_6$, $LiN(CF_3SO_2)_2$ and the like, and compounds of these. The concentration of the supporting electrolyte can be the that of an electrolyte used in a conventional lithium ion secondary battery, and is not particularly limited. It is possible to use an electrolyte that contains a suitable lithium compound (supporting electrolyte) at a concentration of 0.1 mol/L to 5 mol/L.

Furthermore, the non-aqueous electrolyte can also include a radical scavenger, a surfactant, a flame retardant and the like.

(e) Battery Shape and Construction

The shape of a non-aqueous electrolyte secondary battery of the present invention that comprises the cathode, anode and separator explained above can be various shapes such as a cylindrical type, laminated type and the like.

Regardless of the shape used, the cathode and the anode are laminated by way of the separator to form electrodes, and the non-aqueous electrolyte is impregnated into the obtained electrodes, power collection leads are used to connect between the cathode current collector and the cathode terminal that extends to the outside, and between the anode current collector and the anode terminal that extends to the outside, then sealed in a battery case to complete the non-aqueous electrolyte secondary battery.

EXAMPLES

In the following, the present invention will be explained in detail using some examples and comparative examples. Measurement of the average particle size and the particle size distribution was performed using a laser scattering particle size measurement apparatus (Nikkiso Co., Ltd.; Microtrac HRA), and the MV value at 50% cumulated volume was used as the average particle size. Moreover, composition analysis was performed by ICP atomic emission spectrometry using a Varian 725-ES as an ICP atomic emission spectrometry apparatus.

Example 1

Using a reaction tank for continuous crystallization that is equipped with a overflow pipe on the top section, crystallization was performed by a method in which a mixed aqueous solution, having a concentration of 1.8 mol/L that was obtained by dissolving nickel sulfate and cobalt sulfate in water at a mole ratio Ni:Co=0.83:0.17, and a neutralizer that is 25% sodium hydroxide aqueous solution and 25% ammonia water continuously flowed at a constant flow rate into the reaction tank at a solution temperature of 40° C. and a pH value that was maintained at a constant value of 12.0 when measured at a reference solution temperature of 25° C., and the slurry that overflowed was continuously recovered. The average amount of time that the solution stayed in the tank was 20 hours, and after the solution inside the tank reached a state of continuous equilibrium, the slurry was recovered, solid-liquid separation was performed, and crystallized nickel composite hydroxide was obtained.

The obtained nickel composite hydroxide was classified in an elbow jet classifier (MATSUBO Corporation), and separated into fine secondary particles and rough secondary particles. The ratios of the particles were 3.5 volume % for fine secondary particles having an average particle size of 2.58 μm and a particle size distribution range of 1.0 μm to 5.0 μm, and 96.5 volume % for rough secondary particles having an average particle size of 8.45 μm and a particle size distribution range of 3.0 μm to 11 μm.

First, the hydroxide of the rough secondary particles was put into water, and while mixing, $NaAlO_2$ (special grade chemical manufactured by Wako Pure Chemical Industries, Ltd.) was added until the mole ratio became Al/(Ni+Co+Al)=0.039, after which sulfuric acid was used to neutralize the mixture to a target value of pH 9.5. After neutralization, the composition of the hydroxide was $Ni_{0.81}Co_{0.151}Al_{0.039}(OH)_2$.

Next, the hydroxide of the fine secondary particles was put into water, and while mixing, $NaAlO_2$ (special grade chemical manufactured by Wako Pure Chemical Industries, Ltd.) was added until the mole ratio became Al/(Ni+Co+Al)=0.054, after which sulfuric acid was used to neutralize the mixture to a target value of pH 9.5. After neutralization, the composition of the hydroxide was $Ni_{0.802}Co_{0.144}Al_{0.054}(OH)2$.

The ratio of the aluminum content contained in the fine secondary particles and the aluminum content contained in the rough secondary particles (aluminum concentration ratio; SA/LA) was 1.38.

The mixed hydroxide underwent oxidizing roasting using an electric furnace (electric muffle furnace, FUM373 manufactured by ADVANTEC) at 700° C. in an air atmosphere for 6 hours to obtain an oxide. The obtained oxide and lithium hydroxide were mixed until the mole ratio became Li/(Ni+Co+Al)=1.06, then mixed using a shaker mixer (TURBULA Type T2C, manufactured by WAB), to obtain a mixture.

Furthermore, using the electric furnace described above, this mixture was baked at 730° C. for 7 hours in an oxygen atmosphere to obtain cathode active material.

The composition of the obtained cathode active material was $Li_{1.06}Ni_{0.81}Co_{0.1505}Al_{0.0395}O_2$. Moreover, the average particle size and particle size distribution of the fine secondary particles, the average particle size and particle size distribution of the rough secondary particles, and the average overall particle size were, 2.58 μm, 1.0 μm to 5.0 μm, 8.45 μm, 3.0 μm to 11.0 μm and 8.34 μm, respectively, and the aluminum concentration ratio (SA/LA) of the fine secondary particles and the rough secondary particles was 1.38.

Furthermore, using the cathode active material, a cylindrical 18650 type lithium secondary battery was made and the durability was measured.

The cathode active material, acetylene black as a conducting agent, carboxymethyl cellulose (CMC) as a water soluble binder, and polytetrafluoroethylene as a water-dispersible binder are weighed until the mass ratio of these materials became 88:10:1:1, and then these materials were added to ion-exchanged water so that the solid fraction of the materials was 54% by mass. Next, the materials were mixed in a planetary mixer for 50 minutes to create a cathode active layered paste.

The created water-based paste was applied to both surfaces of aluminum foil having a thickness of about 15 μm as the cathode current collector so that the total coating was approximately 9.5 g/cm², after which moisture content in the paste was dried, and the paste was pressed into a sheet shape with a roller press and adjusted until the layer thickness was 60 μm, to create the cathode sheet for a lithium secondary battery.

Next, anode active material made of graphite, styrene-butadiene rubber (SBR) and carboxymethyl cellulose (CMC) as a binding agent were mixed with ion-exchanged water so that the mass ratio of these materials became 98:1:1, to create a pasted for a layered anode active material. Then, the paste was applied to both sides of copper foil having a thickness of about 10 μm as an anode current collector until the total coating weight was approximately 9.0 g/cm², after which the moisture content in the paste was dried, then pressed into a sheet shape with a roller press, and adjusted so that the layer thickness was 60 μm to create an anode sheet for a lithium secondary battery.

The obtained cathode sheet and anode sheet were layered together with two porous polyethylene sheet, and this laminated sheet was wound up to create a wound electrode structure. This electrode structure was housed in a vessel to create a cylindrical lithium ion secondary battery having a diameter of 18 mm and a height of 65 mm. As the electrolyte, a non-aqueous electrolyte formed by dissolving a supporting electrolyte $LiPF_6$ having a concentration of 1 mol/L in to a mixed solvent of ethylene carbonate (EC) and dimethyl carbonate (DMC) at a volume ratio of 1:1 was used. The lithium ion secondary battery of a first example was created in this way.

Furthermore, by charging the battery to 4.1V at a charging current rate of ⅓ C as a conditioning process, a lithium ion secondary battery was created for testing.

In order to investigate the cycling characteristic of the obtained battery, charging and discharging were repeated for 500 cycles under conditions of an electric potential width from 3.0 V to 4.1 V, a current rate of 1 C, and a temperature of 80° C., after which at a capacity ratio taking the initial discharge capacity to be 100, the electric discharge capacity maintenance rate was calculated and found to be 89%. The measured values for the cathode active material are given in Table 1 together with the calculated values for the electric discharge capacity maintenance rate.

Example 2

Except for the mole ratio of 0.098 of the amount of aluminum added to the fine secondary particles, a cathode active material was obtained in the same way as in Example 1. The composition of the obtained cathode active material was $Li_{1.06}Ni_{0.808}Co_{0.151}Al_{0.041}O_2$. The average particle size and particle size distribution of the fine secondary particles, the average particle size and particle size distribution of the rough secondary particles, and the average overall particle size were, 2.62 μm, 1.0 μm to 5.0 μm, 8.42 μm, 3.0 μm to 11.0 μm and 8.32 μm, respectively, and the aluminum concentration ratio (SA/LA) of the fine secondary particles and the rough secondary particles was 2.51. The electric discharge capacity maintenance rate that was measured in the same way as in Example 1 was found to be 92%.

Example 3

Except for the mole ratio of 0.047 of the amount of aluminum added to the fine secondary particles, a cathode active material was obtained in the same way as in Example 1. The composition of the obtained cathode active material was $Li_{1.06}Ni_{0.81}Co_{0.151}Al_{0.039}O_2$. The average particle size and particle size distribution of the fine secondary particles, the average particle size and particle size distribution of the rough secondary particles, and the average overall particle size were, 2.51 µm, 1.0 µm to 5.0 µm, 8.43 µm, 3.0 µm to 11.0 µm and 8.37 µm, respectively, and the aluminum concentration ratio (SA/LA) of the fine secondary particles and the rough secondary particles was 1.21. The electric discharge capacity maintenance rate that was measured in the same way as in Example 1 was found to be 88%.

Example 4

Except that the conditions for separating the fine secondary particles and rough secondary particles of the hydroxide were changed, such that the volume ratio of fine secondary particles having an average particle size of 2.06 µm and a particle size distribution range of 1 µm to 3 µm was 1.7 volume %, and the volume ratio of rough secondary particles having an average particle size of 8.52 µm and a particle size distribution range of 3 µm to 25 µm was 98.3 volume %, a cathode active material was obtained in the same way as in Example 1. The composition of the obtained cathode active material was $Li_{1.06}Ni_{0.817}Co_{0.144}Al_{0.039}O_2$. The average particle size and particle size distribution of the fine secondary particles, the average particle size and particle size distribution of the rough secondary particles, and the average overall particle size were, 2.06 µm, 1.0 µm to 3.0 µm, 8.39 µm, 3.0 µm to 25.0 µm and 8.34 µm, respectively, and the aluminum concentration ratio (SA/LA) of the fine secondary particles and the rough secondary particles was 1.38. The electric discharge capacity maintenance rate that was measured in the same way as in Example 1 was found to be 85%.

Example 5

Except that the conditions for separating the fine secondary particles and rough secondary particles of the hydroxide were changed, such that the volume ratio of fine secondary particles having an average particle size of 3.45 µm and a particle size distribution range of 1 µm to 5.5 µm was 6.3 volume %, and the volume ratio of rough secondary particles having an average particle size of 8.67 µm and a particle size distribution range of 6 µm to 25 µm was 93.7 volume %, a cathode active material was obtained in the same way as in Example 1. The composition of the obtained cathode active material was $Li_{1.06}Ni_{0.81}Co_{0.15}Al_{0.04}O_2$. The average particle size and particle size distribution of the fine secondary particles, the average particle size and particle size distribution of the rough secondary particles, and the average overall particle size were, 3.45 µm, 1.0 µm to 5.5 µm, 8.67 µm, 6.0 µm to 25.0 µm and 8.32 µm, respectively, and the aluminum concentration ratio (SA/LA) of the fine secondary particles and the rough secondary particles was 1.38. The electric discharge capacity maintenance rate that was measured in the same way as in Example 1 was found to be 92%.

Example 6

Except for the mole ratio of 0.045 of the amount of aluminum added to the fine secondary particles, a cathode active material was obtained in the same way as in Example 1. The composition of the obtained cathode active material was $Li_{1.06}Ni_{0.81}Co_{0.151}Al_{0.039}O_2$. The average particle size and particle size distribution of the fine secondary particles, the average particle size and particle size distribution of the rough secondary particles, and the average overall particle size were, 2.62 µm, 1.0 µm to 5.0 µm, 7.89 µm, 3.0 µm to 11.0 µm and 8.38 µm, respectively and the aluminum concentration ratio (SA/LA) of the fine secondary particles and the rough secondary particles was 1.15. The electric discharge capacity maintenance rate that was measured in the same way as in Example 1 was found to be 82%.

Comparative Example 1

Except that Al was added so that the mole ratio became Al/(Ni+Co+Al)=0.039 without classifying the particles, a cathode active material was obtained in the same way as in Example 1. The composition of the obtained cathode active material was $Li_{1.06}Ni_{0.81}Co_{0.151}Al_{0.039}O_2$. The average particle size of the obtained cathode active material was 8.38 µm. After classifying the particles as in Example 1, the aluminum concentration ratio (SA/LA) of the fine secondary particles and the rough secondary particles was 1.10. The electric discharge capacity maintenance rate that was measured in the same way as in Example 1 was found to be 50%.

Comparative Example 2

Using a reaction tank for continuous crystallization that is equipped with a overflow pipe on the top section, crystallization was performed by a method in which a mixed aqueous solution, having a concentration of 1.8 mol/L that was obtained by dissolving nickel sulfate and cobalt sulfate in water at a mole ratio Ni:Co=0.85:0.15, and a neutralizer solution that is 25% sodium hydroxide aqueous solution, 25% ammonia water and a sodium aluminate dissolved in pure water continuously flowed at a constant flow rate into the reaction tank at a pH value that was maintained at a constant value of 12.0 when measured at a reference solution temperature of 25° C., and the slurry that overflowed was continuously recovered. The average amount of time that the solution stayed in the tank was 20 hours, and after the solution inside the tank reached a state of continuous equilibrium, the slurry was recovered, solid-liquid separation was performed, and crystallized composite hydroxide was obtained.

The obtained hydroxide underwent oxidizing roasting using an electric furnace (electric muffle furnace, FUM373 manufactured by ADVANTEC) at 700° C. in an air atmosphere for 6 hours to obtain an oxide. The obtained oxide and lithium hydroxide were mixed until the mole ratio became Li/(Ni+Co+Al)=1.06, then mixed using a shaker mixer (TURBULA Type T2C, manufactured by WAB), to obtain a mixture.

Furthermore, except for using the furnace described above to bake this mixture at 730° C. for 16 hours in an oxygen atmosphere to obtain cathode active material, the cycling characteristic was evaluated in the same way as in Example 1.

The composition of the obtained cathode active material was $Li_{1.06}Ni_{0.81}Co_{0.15}Al_{0.04}O_2$. Moreover, the average particle size of the obtained cathode active material was 10.29 µm.

After classifying the particles of the obtained cathode active material with the same method as in Example 1, the respective aluminum contents were analyzed and the aluminum concentration ratio (SA/LA) of the fine secondary particles and the rough secondary particles was 1.02. The electric discharge capacity maintenance rate that was measured in the same way as in Example 1 was found to be 29%,

TABLE 1

| | Average Particle Size (μm) | | | Ratio of fine secondary particles (volume %) | Aluminum concentration ratio (SA/LA) | Capacity maintenance rate (%) |
|---|---|---|---|---|---|---|
| | Fine secondary particles | Rough secondary particles | Mixed particles | | | |
| Example 1 | 2.56 | 8.45 | 8.34 | 3.5 | 1.38 | 89 |
| Example 2 | 2.62 | 8.42 | 8.32 | 3.5 | 2.51 | 92 |
| Example 3 | 2.51 | 8.43 | 8.37 | 3.5 | 1.21 | 88 |
| Example 4 | 2.06 | 8.39 | 8.34 | 1.7 | 1.38 | 85 |
| Example 5 | 3.45 | 8.67 | 8.32 | 6.3 | 1.38 | 92 |
| Example 6 | 2.62 | 7.89 | 8.38 | 3.5 | 1.15 | 82 |
| Comparative example 1 | — | — | 8.38 | — | 1.10 | 50 |
| Comparative example 2 | — | — | 10.29 | — | 1.02 | 29 |

INDUSTRIAL APPLICABILITY

The non-aqueous electrolyte secondary battery of the present invention has a high cycling characteristic while at the same time has excellent safety, and is suitable as a power source for an automobile that is used over a long period of time.

Moreover, in a power source for an electric automobile, maintaining safety is difficult due to the large size of the battery, and an expensive protection circuit for maintaining a higher level of safety is necessary. However, the non-aqueous electrolyte secondary battery of the present invention has excellent safety characteristics, so has high reliability from the aspect of safety, and is suitable even as a power source for an electric automobile. The present invention can be used not only as a power source for an electric automobile that drives a vehicle purely by electric energy, by can also be used as a power source for a so-called hybrid automobile and used together with a combustion engine such as a gasoline engine or diesel engine.

What is claimed is:

1. A cathode active material for a non-aqueous electrolyte secondary battery that is a lithium nickel composite oxide represented by the general formula: $Li_wNi_{1-x-y-z}Co_xAl_yM_zO_2$ (M is at least one kind of element selected from the group of Mn, Ti, Ca, Mg, Nb, Si, Zr and W (Tungsten), and $0.99 \leq w \leq 1.10$, $0.05 \leq x \leq 0.20$, $0.035 \leq y \leq 0.1$, $0 \leq z \leq 0.01$), and the lithium nickel composite oxide comprising secondary particles composed of fine secondary particles having an average particle size of 2 μm to 4 μm and rough secondary particles having an average particle size of 6 μm to 9 μm, with the secondary particles having an overall average particle size of 5 μm to 15 μm,
    wherein a particle size distribution of the fine secondary particles according to laser diffraction scattering measurement is in a range of 0.5 μm to 6 μm, and a particle size distribution of the rough secondary particles according to the laser diffraction scattering measurement is in a range of 3 μm to 9 μm,
    wherein a ratio of aluminum content of the fine secondary particles, expressed as a metal molar ratio representing the amount of aluminum with respect to the total amount of metal other than lithium included in the fine secondary particles, to aluminum content of the rough secondary particles, expressed as a metal molar ratio representing the amount of aluminum with respect to the total amount of metal other than lithium included in the rough secondary particles, is within a range of 1.12 to 2.6, and
    wherein a volume ratio of mixed fine secondary particles is 1% to 4% by volume with respect to the overall lithium nickel composite oxide.

2. The cathode active material for a non-aqueous electrolyte secondary battery according to claim 1, wherein the ratio is within a range of 1.2 to 2.6.

3. The cathode active material for a non-aqueous electrolyte secondary battery according to claim 1, wherein the value "y" of composition ratio of Al is within a range of 0.039 to 0.1.

4. The cathode active material for a non-aqueous electrolyte secondary battery according to claim 1, wherein the value "x" of composition ratio of Co is within a range of 0.05 to 0.151.

5. A non-aqueous electrolyte secondary battery that uses the cathode active material for a non-aqueous electrolyte secondary battery according to claim 1 as a cathode material thereof.

* * * * *